US012786559B2

(12) United States Patent
Miyazaki

(10) Patent No.: US 12,786,559 B2
(45) Date of Patent: Nov. 3, 2026

(54) POSITIONING SYSTEM AND POSITIONING METHOD

(71) Applicant: Sony Interactive Entertainment Inc., Tokyo (JP)

(72) Inventor: Yoshio Miyazaki, Tokyo (JP)

(73) Assignee: SONY INTERNACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 19/129,098

(22) PCT Filed: Nov. 16, 2022

(86) PCT No.: PCT/JP2022/042521

§ 371 (c)(1),
(2) Date: May 12, 2025

(87) PCT Pub. No.: WO2024/105800

PCT Pub. Date: May 23, 2024

(65) Prior Publication Data

US 2026/0172672 A1 Jun. 18, 2026

(51) Int. Cl.

| | |
|---|---|
| ***H04N 23/66*** | (2023.01) |
| ***G06T 7/70*** | (2017.01) |
| ***H01Q 1/22*** | (2006.01) |
| ***H04N 23/90*** | (2023.01) |

(52) U.S. Cl.
CPC ............... *H04N 23/66* (2023.01); *G06T 7/70* (2017.01); *H01Q 1/22* (2013.01); *H04N 23/90* (2023.01); *G06T 2207/30196* (2013.01)

(58) Field of Classification Search
CPC .......... H04N 23/66; H04N 23/90; G06T 7/70; G06T 2207/30196; H01Q 1/22
USPC .......................................................... 348/135
See application file for complete search history.

(56) References Cited

U.S. PATENT DOCUMENTS

2007/0103313 A1* 5/2007 Washington ..... G08B 13/19608 340/8.1

FOREIGN PATENT DOCUMENTS

| | | | | |
|---|---|---|---|---|
| JP | 7-154846 A | | 6/1995 | |
| JP | 202043510 A | | 3/2020 | |
| JP | 2020043510 A | * | 3/2020 | ......... G02B 27/0955 |
| JP | 2022-111143 A | | 7/2022 | |

OTHER PUBLICATIONS

PCT/JP2022/042521, "International Search Report", Feb. 7, 2023, 4 pages.

* cited by examiner

*Primary Examiner* — Sath V Perungavoor
*Assistant Examiner* — Kristin Dobbs
(74) *Attorney, Agent, or Firm* — Kilpatrick Townsend & Stockton LLP

(57) ABSTRACT

In a positioning system, power consumption by cameras is reduced. A positioning system includes an antenna disposed at a position of a camera and a wireless communication apparatus to be held by a moving object. The camera executes image capturing processing in a case where a distance between the antenna and the wireless communication apparatus calculated on the basis of communication between the antenna and the wireless communication apparatus is within a predetermined range, but restricts execution of the image capturing processing in a case where the calculated distance is outside the predetermined range.

10 Claims, 8 Drawing Sheets

POSITIONING SYSTEM AND POSITIONING METHOD

CROSS-REFERENCE TO RELATED APPLICATIONS

This application is a U.S. National Stage Application under 35 U.S.C. § 371 of International Application No. PCT/JP2022/042521, filed Nov. 16, 2022, the entire disclosures of which is incorporated herein by reference for all purposes.

TECHNICAL FIELD

The present disclosure relates to a positioning system and a positioning method.

BACKGROUND ART

In PTL 1, it is described that an imaging apparatus such as a camera captures an image of a user wearing an HMD (Head-mounted Display), thereby identifying the position of the head of the user in real space. Further, in PTL 1, it is described that a play area is set in real space on the basis of the angle of view of the imaging apparatus and, when it is determined that a warning is necessary, such as when the position of the head of the user moves outside the play area, the HMD is caused to display a warning image representing the fact.

Citation List

Patent Literature

[PTL 1] Japanese Patent Laid-open No. 2022-111143

SUMMARY

Technical Problem

For example, a plurality of cameras for capturing images of an HMD are provided, and images are captured at different positions in real space by the respective cameras, thereby enabling the expansion of a play area in real space. A user can move within such an expanded play area. In a case where a moving object such as the head of the user is visible in a lens of at least one of the plurality of cameras, the position of the moving object in real space can be identified through analysis of an image captured by that camera.

However, for example, even in a case where the moving object is not visible in the lens of one camera, the one camera needs to continue image capturing processing in order to promptly identify the position of the moving object when the moving object enters the angle of view of the one camera. That is, the cameras constantly execute the image capturing processing, causing a problem of high power consumption by the cameras.

It is an object of the present disclosure to provide a positioning system and a positioning method that can reduce power consumption by cameras.

Solution to Problem

A positioning system according to the present disclosure includes a camera for capturing an image of a moving object, an antenna disposed at a position of the camera, an arithmetic apparatus configured to calculate a position of the moving object on the basis of an image captured by the camera, and a wireless communication apparatus to be held by the moving object, the wireless communication apparatus being capable of communicating with the antenna. An apparatus including the antenna, the wireless communication apparatus, or the arithmetic apparatus calculates a distance between the antenna and the wireless communication apparatus on the basis of communication between the antenna and the wireless communication apparatus. The camera executes image capturing processing in a case where the calculated distance is within a predetermined range, but restricts execution of the image capturing processing in a case where the calculated distance is outside the predetermined range. According to this, in the positioning system including the camera, power consumption by the camera can be reduced.

Further, a positioning system according to the present disclosure includes a first camera for capturing an image of a moving object, a second camera disposed apart from the first camera, for capturing an image of the moving object, a first antenna disposed at a position of the first camera, a second antenna disposed at a position of the second camera, an arithmetic apparatus configured to calculate a position of the moving object on the basis of an image captured by a camera including at least the first camera or the second camera, and a wireless communication apparatus to be held by the moving object, the wireless communication apparatus being capable of communicating with the first antenna and the second antenna. An apparatus including the first antenna, the wireless communication apparatus, or the arithmetic apparatus calculates a first distance between the first antenna and the wireless communication apparatus on the basis of communication between the first antenna and the wireless communication apparatus. An apparatus including the second antenna, the wireless communication apparatus, or the arithmetic apparatus calculates a second distance between the second antenna and the wireless communication apparatus on the basis of communication between the second antenna and the wireless communication apparatus. The first camera executes image capturing processing in a case where the calculated first distance is within a predetermined range, but restricts execution of the image capturing processing in a case where the calculated first distance is outside the predetermined range. The second camera executes image capturing processing in a case where the calculated second distance is within a predetermined range, but restricts execution of the image capturing processing in a case where the calculated second distance is outside the predetermined range. According to this, in the positioning system including the cameras, power consumption by the cameras can be reduced.

Further, a positioning method according to the present disclosure is performed in a positioning system including a camera for capturing an image of a moving object, an antenna disposed at a position of the camera, an arithmetic apparatus configured to calculate a position of the moving object on the basis of an image captured by the camera, and a wireless communication apparatus to be held by the moving object, the wireless communication apparatus being capable of communicating with the antenna. The method includes calculating, by an apparatus including the antenna, the wireless communication apparatus, or the arithmetic apparatus, a distance between the antenna and the wireless communication apparatus on the basis of communication between the antenna and the wireless communication apparatus, and executing, by the camera, image capturing processing in a case where the calculated distance is within a predetermined range, but restricting execution of the image capturing processing in a case where the calculated distance is outside the predetermined range. According to this, in the positioning system including the camera, power consumption by the camera can be reduced.

Further, a positioning method according to the present disclosure is performed in a positioning system including a first camera for capturing an image of a moving object, a second camera disposed apart from the first camera, for capturing an image of the moving object, a first antenna disposed at a position of the first camera, a second antenna disposed at a position of the second camera, an arithmetic apparatus configured to calculate a position of the moving object on the basis of an image captured by a camera including at least the first camera or the second camera, and a wireless communication apparatus to be held by the moving object, the wireless communication apparatus being capable of communicating with the first antenna and the second antenna. The method includes calculating, by an apparatus including the first antenna, the wireless communication apparatus, or the arithmetic apparatus, a first distance between the first antenna and the wireless communication apparatus on the basis of communication between the first antenna and the wireless communication apparatus, calculating, by an apparatus including the second antenna, the wireless communication apparatus, or the arithmetic apparatus, a second distance between the second antenna and the wireless communication apparatus on the basis of communication between the second antenna and the wireless communication apparatus, executing, by the first camera, image capturing processing in a case where the calculated first distance is within a predetermined range, but restricting execution of the image capturing processing in a case where the calculated first distance is outside the predetermined range, and executing, by the second camera, image capturing processing in a case where the calculated second distance is within a predetermined range, but restricting execution of the image capturing processing in a case where the calculated second distance is outside the predetermined range. According to this, in the positioning system including the cameras, power consumption by the cameras can be reduced.

DESCRIPTION OF EMBODIMENT

1. Configuration of System

Figure 1:
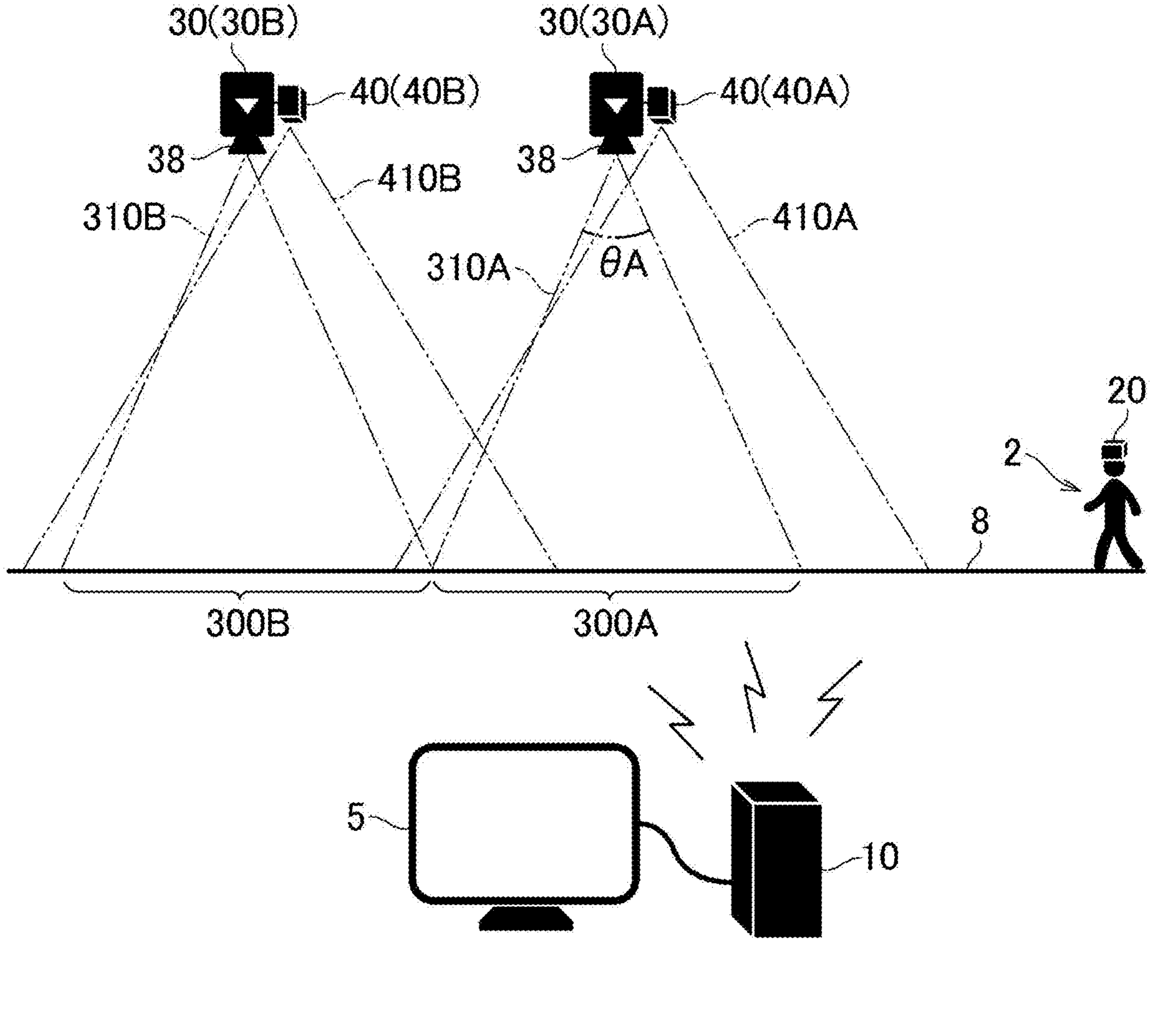
FIG. 1 is a diagram illustrating a positioning system that is an example of an embodiment of the present disclosure.

An embodiment of the present disclosure is described below with reference to the drawings. FIG. 1 is a diagram illustrating a positioning system 1 that is an example of the embodiment of the present disclosure. As illustrated in FIG. 1, the positioning system 1 includes a wireless communication apparatus 20 possessed by a user 2 who is a moving object. In the example illustrated in FIG. 1, the wireless communication apparatus 20 is an HMD worn on the head of the user 2. The wireless communication apparatus 20 may be capable of wired or wireless communication with an arithmetic apparatus 10 which executes applications such as games. The positioning system 1 may also include the arithmetic apparatus 10 and a display device 5, such as a liquid crystal display or an organic EL (Electro Luminescence) display, electrically connected to the arithmetic apparatus 10.

As illustrated in FIG. 1, the positioning system 1 includes a camera 30 for capturing an image of the user 2. In the example illustrated in FIG. 1, the positioning system 1 includes a plurality of the cameras 30. More specifically, the positioning system 1 includes a first camera 30A and a second camera 30B disposed apart from the first camera 30A. The positioning system 1 may include another camera 30 for capturing an image of the user 2, in addition to the first and second cameras 30A. It is preferable that the plurality of cameras 30 each be disposed apart from the other cameras 30.

The plurality of cameras 30 are disposed apart from the user 2. In the example illustrated in FIG. 1, the plurality of cameras 30 are disposed above the user 2. Further, lenses 38 of the plurality of cameras 30 all face the same direction. In the example illustrated in FIG. 1, the lenses 38 of the plurality of cameras 30 all face downward. The lenses 38 of the plurality of cameras 30 may also face a diagonal direction.

The camera 30 is capable of wired or wireless communication with the arithmetic apparatus 10. The arithmetic apparatus 10 receives (acquires) an image captured by the camera 30 from the camera 30 and calculates the position of the user 2, who is a moving object, on the basis of the captured image. The arithmetic apparatus 10 can change an image to be displayed on the display device 5 (e.g., the positions of objects in the image), on the basis of the calculated position of the user 2. The arithmetic apparatus 10 may transmit the calculated position of the user 2 to the wireless communication apparatus 20. In a case where the wireless communication apparatus 20 is an HMD and includes a display panel, such as a liquid crystal panel or an organic EL panel, to be disposed in front of the eyes of the user 2, the wireless communication apparatus 20 can change an image to be projected on the display panel in front of the eyes of the user 2, on the basis of the position of the user 2 (for example, the position of the head of the user 2 on which the wireless communication apparatus 20 is worn) received (acquired) from the arithmetic apparatus 10.

As illustrated in FIG. 1, the positioning system 1 includes an antenna apparatus 40 disposed at the position of the camera 30. In the example illustrated in FIG. 1, the positioning system 1 includes a plurality of the antenna apparatuses 40. More specifically, the positioning system 1 includes a first antenna apparatus 40A disposed at the position of the first camera 30A and a second antenna apparatus 40B disposed at the position of the second camera 30B. The plurality of antenna apparatuses 40 are disposed at the respective positions of the plurality of cameras 30.

The "position of the camera 30" refers to a position within a predetermined range (for example, a range of 0 to 0.5 m) centered on the camera 30. The antenna apparatus 40 may directly be attached to the camera 30 or may be built into the camera 30.

The camera 30 is capable of wired or wireless communication with the antenna apparatus 40 disposed at the position of the camera 30. In other words, the antenna apparatus 40 is capable of wired or wireless communication with the camera 30 disposed at the position of the antenna apparatus 40 (a position within a predetermined range (for example, a range of 0 to 1 m) centered on the antenna apparatus 40). Further, the antenna apparatus 40 includes an antenna to be described later and is capable of wirelessly communicating with the wireless communication apparatus 20 held by the user.

As described later, in the positioning system 1 according to the present embodiment, the antenna apparatus 40, the wireless communication apparatus 20, or the arithmetic apparatus 10 calculates, on the basis of communication between an antenna 43*a* (see FIG. 4) disposed at the position of the camera 30 and the wireless communication apparatus 20 (more specifically, an antenna 23*a*), the distance between the antenna 43*a* and the wireless communication apparatus 20. Then, the camera 30 executes image capturing processing in a case where the calculated distance is within a predetermined range (for example, a range of 0 to 10 m), but restricts the execution of the image capturing processing in a case where the calculated distance is outside the predetermined range. With this configuration, power consumption by the camera 30 can be reduced.

2. Hardware Configuration

Figure 2A:
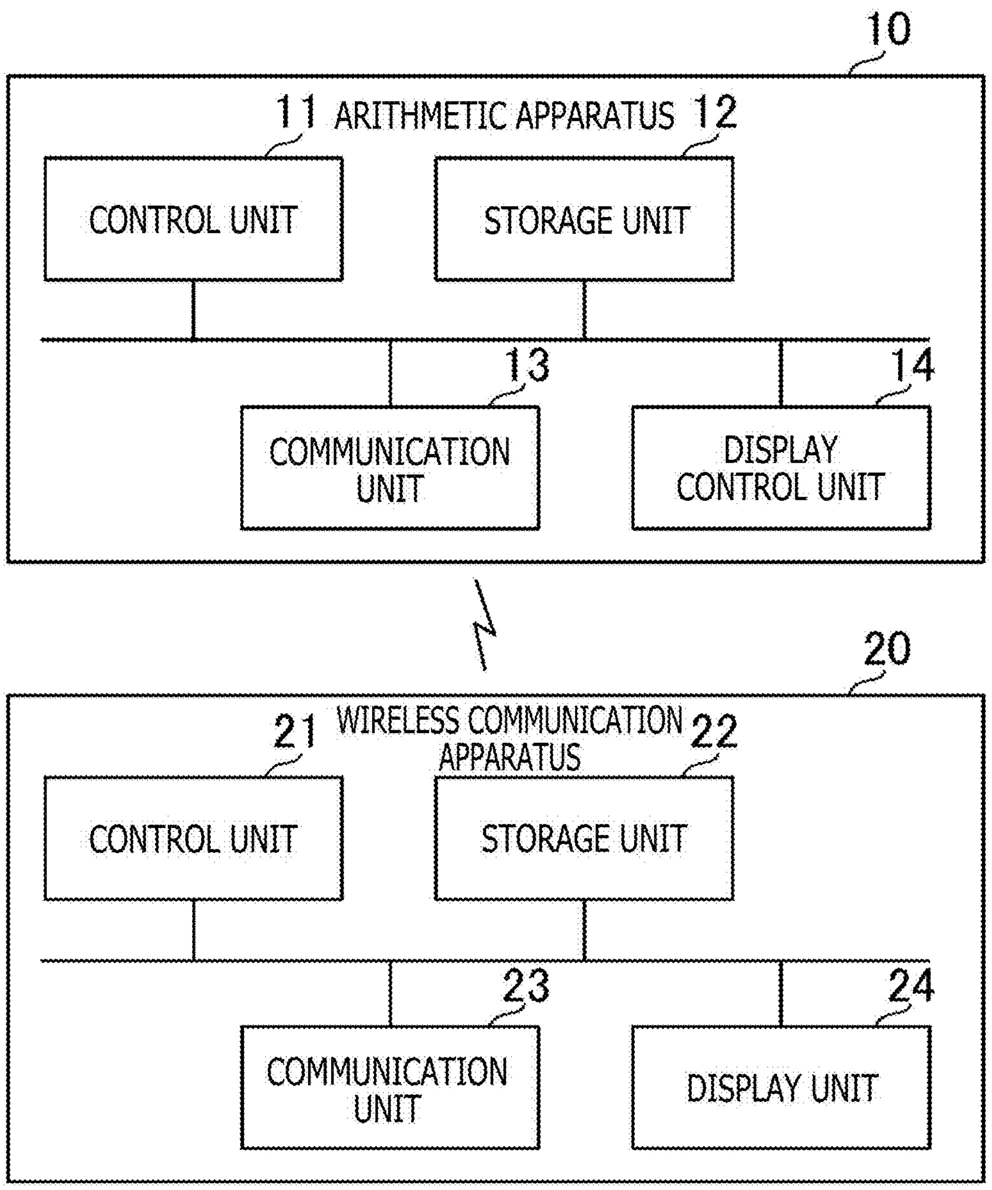
FIG. 2A is a diagram illustrating an example of the hardware configurations of an arithmetic apparatus and an operation device.
Figure 2B:
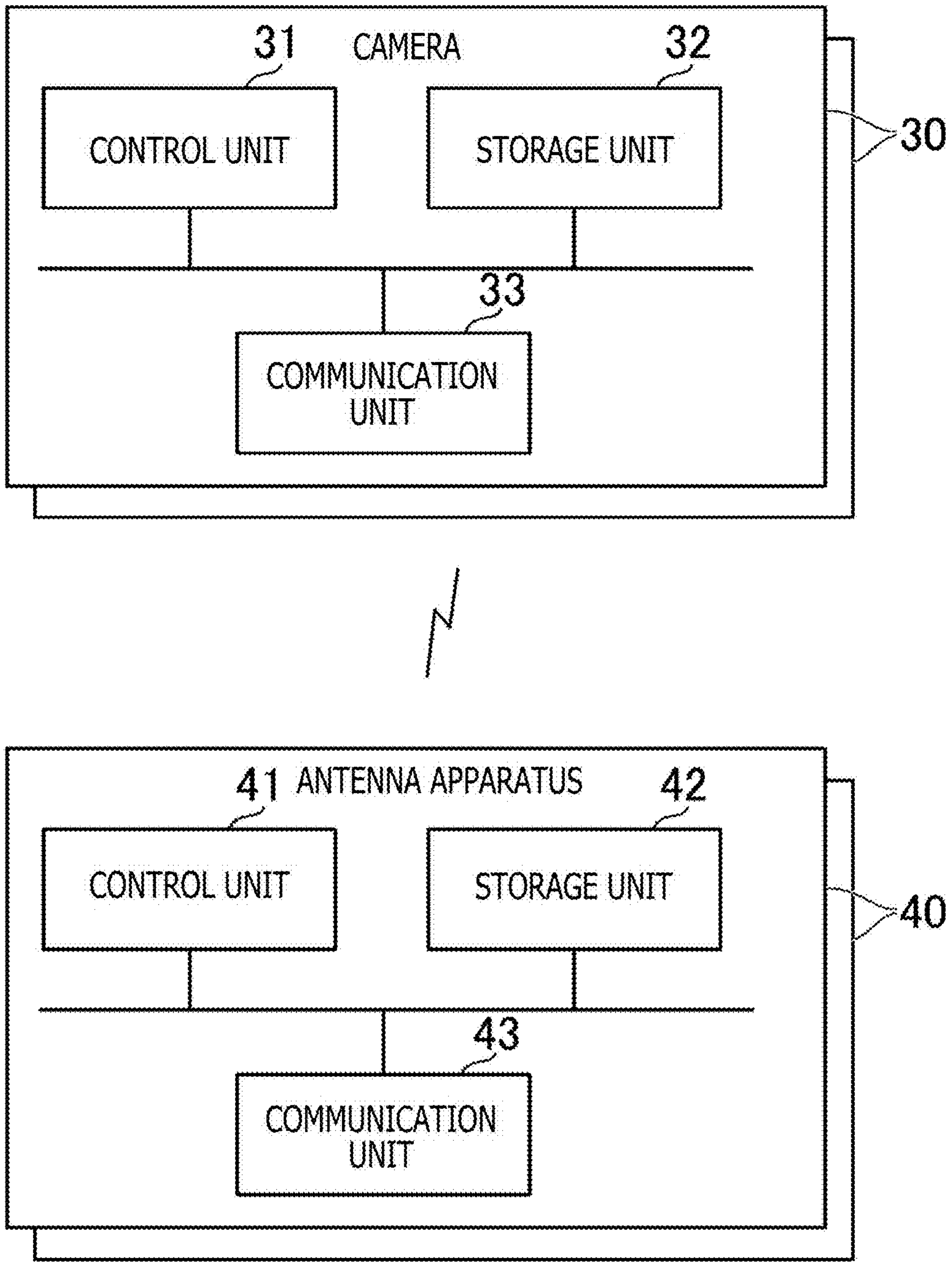
FIG. 2B is a diagram illustrating an example of the hardware configurations of a camera and an antenna apparatus.

FIG. 2A is a diagram illustrating an example of the hardware configurations of the arithmetic apparatus 10 and the wireless communication apparatus 20. FIG. 2B is a diagram illustrating an example of the hardware configurations of the camera 30 and the antenna apparatus 40. The arithmetic apparatus 10 is, for example, a computer such as a game console, a video reproduction apparatus, a personal computer, or a server apparatus. As illustrated in FIG. 2A, the arithmetic apparatus 10 includes, for example, a control unit 11, a storage unit 12, a communication unit 13, and a display control unit 14.

In the arithmetic apparatus 10, the control unit 11 is a program control-use processor (control-use device), such as a CPU (Central Processing Unit), configured to operate according to programs such as firmware stored in the storage unit 12. The storage unit 12 is a storage element such as a ROM (Read Only Memory) or a RAM (Random Access Memory), or an auxiliary storage device such as an SSD (Solid State Drive) or an HDD (Hard Disk Drive). The communication unit 13 is, for example, a communication device such as a network board. The display control unit 14 transmits video signals to the display device 5, thereby causing the display device 5 to display various images. In addition to these, the arithmetic apparatus 10 may also include an optical disc drive configured to read optical discs, a video output terminal such as an HDMI (High-Definition Multimedia Interface) (registered trademark), a data input/output terminal such as a USB (Universal Serial Bus), and an audio input/output terminal such as a microphone, a speaker, and an earphone jack.

The wireless communication apparatus 20 is, for example, an HMD to be worn on the head of the user 2. The wireless communication apparatus 20 may be an input device, such as a game controller, to be grasped by the user 2, or may be a portable terminal. The wireless communication apparatus 20 may be an apparatus to be attached to a robot that is a moving object, or may be an apparatus to be built into the robot.

As illustrated in FIG. 2A, the wireless communication apparatus 20 includes, similarly to the arithmetic apparatus 10, a control unit 21, which is a processor, a storage unit 22, which is a storage device, and a communication unit 23, which is a communication device. The control unit 21 of the wireless communication apparatus 20 operates according to programs (e.g., firmware) stored in the storage unit 22. The display unit 24 may be a display panel such as a liquid crystal panel or an organic EL panel. In a case where the wireless communication apparatus 20 is an HMD, the display unit 24 is disposed in front of the eyes of the user 2 wearing the wireless communication apparatus 20, to display images in front of the eyes of the user 2.

The communication unit 23 of the wireless communication apparatus 20 is capable of wired or wireless communication with the communication unit 13 of the arithmetic apparatus. The communication unit 23 of the wireless communication apparatus 20 including the antenna 23*a* (see FIG. 4) is capable of wirelessly communicating with a communication unit 43, which is to be described later, of the antenna apparatus 40.

The camera 30 is for capturing images of the head of the user 2, who is a moving object, and includes the lens 38 (see FIG. 1). As illustrated in FIG. 2B, the camera 30 includes, similarly to the arithmetic apparatus 10 and the wireless communication apparatus 20, a control unit 31, which is a processor, a storage unit 32, which is a storage device, and a communication unit 33, which is a communication device. The control unit 31 of the camera 30 operates according to programs (e.g., firmware) stored in the storage unit 32. The communication unit 33 of the camera 30 is capable of wired or wireless communication with the communication unit 13 of the arithmetic apparatus 10.

As illustrated in FIG. 2B, the antenna apparatus 40 includes, similarly to the arithmetic apparatus 10 and the wireless communication apparatus 20, a control unit 41, which is a processor, a storage unit 42, which is a storage device, and the communication unit 43, which is a communication device. The control unit 41 of the antenna apparatus 40 operates according to programs (e.g., firmware) stored in the storage unit 42, for example. The communication unit 43 of the antenna apparatus 40 is capable of wired or wireless communication with the communication unit 13 of the arithmetic apparatus 10. The communication unit 43 of the antenna apparatus 40 including, for example, the antenna 43*a* illustrated in FIG. 4 is capable of wirelessly communicating with the communication unit 23 of the wireless communication apparatus 20.

Figure 4:
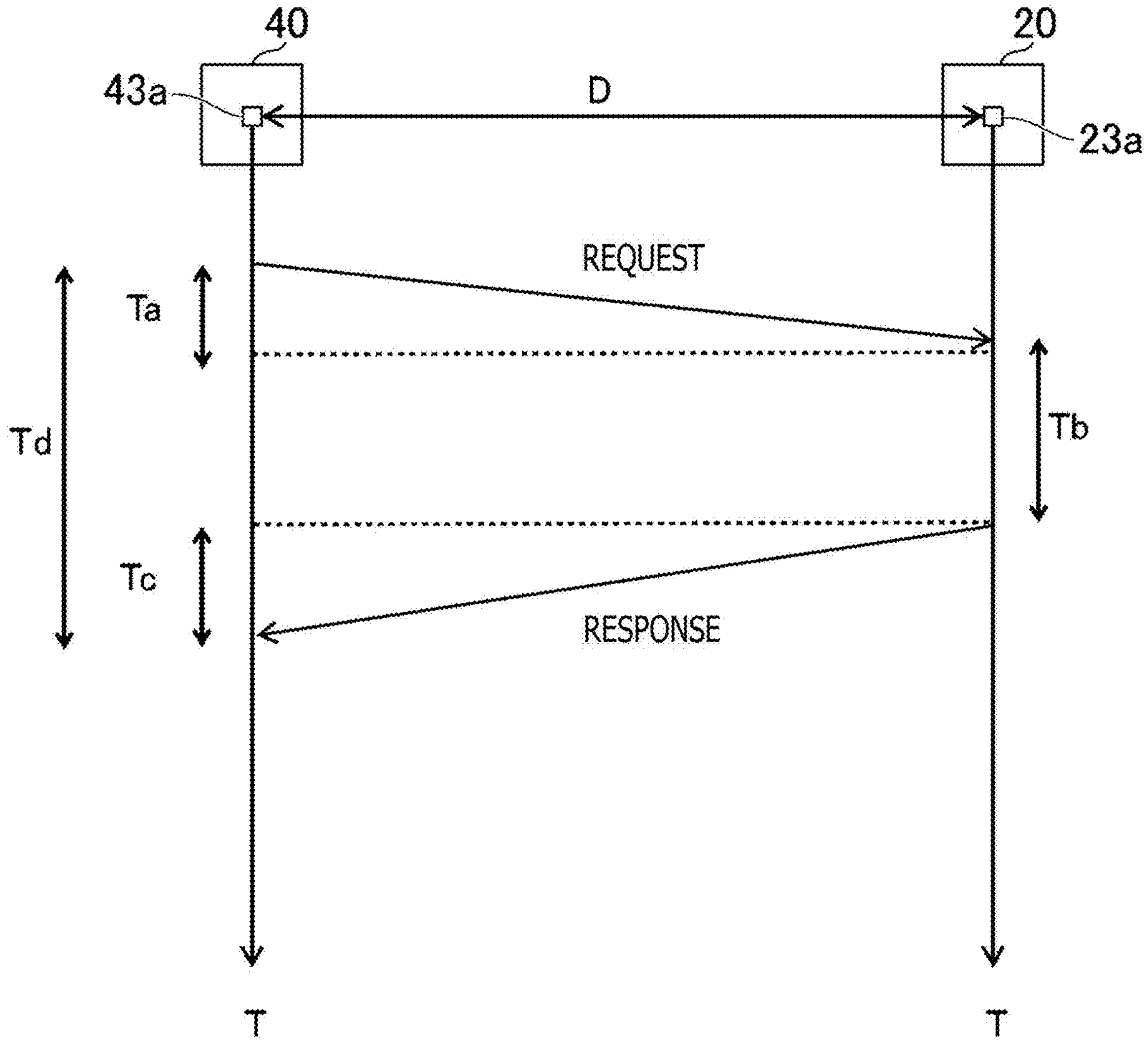
FIG. 4 is a diagram illustrating an example of a method of calculating distance by a distance measurement section.

The antenna 43*a* illustrated in FIG. 4 may be included in the communication unit 33 of the camera 30 instead of the communication unit 43 of the antenna apparatus 40. In this case, the positioning system 1 may not include the antenna apparatus 40, and the functions of the antenna apparatus 40 to be described later may be implemented primarily by the control unit 31 of the camera 30.

3. Functional Blocks

Figure 3:
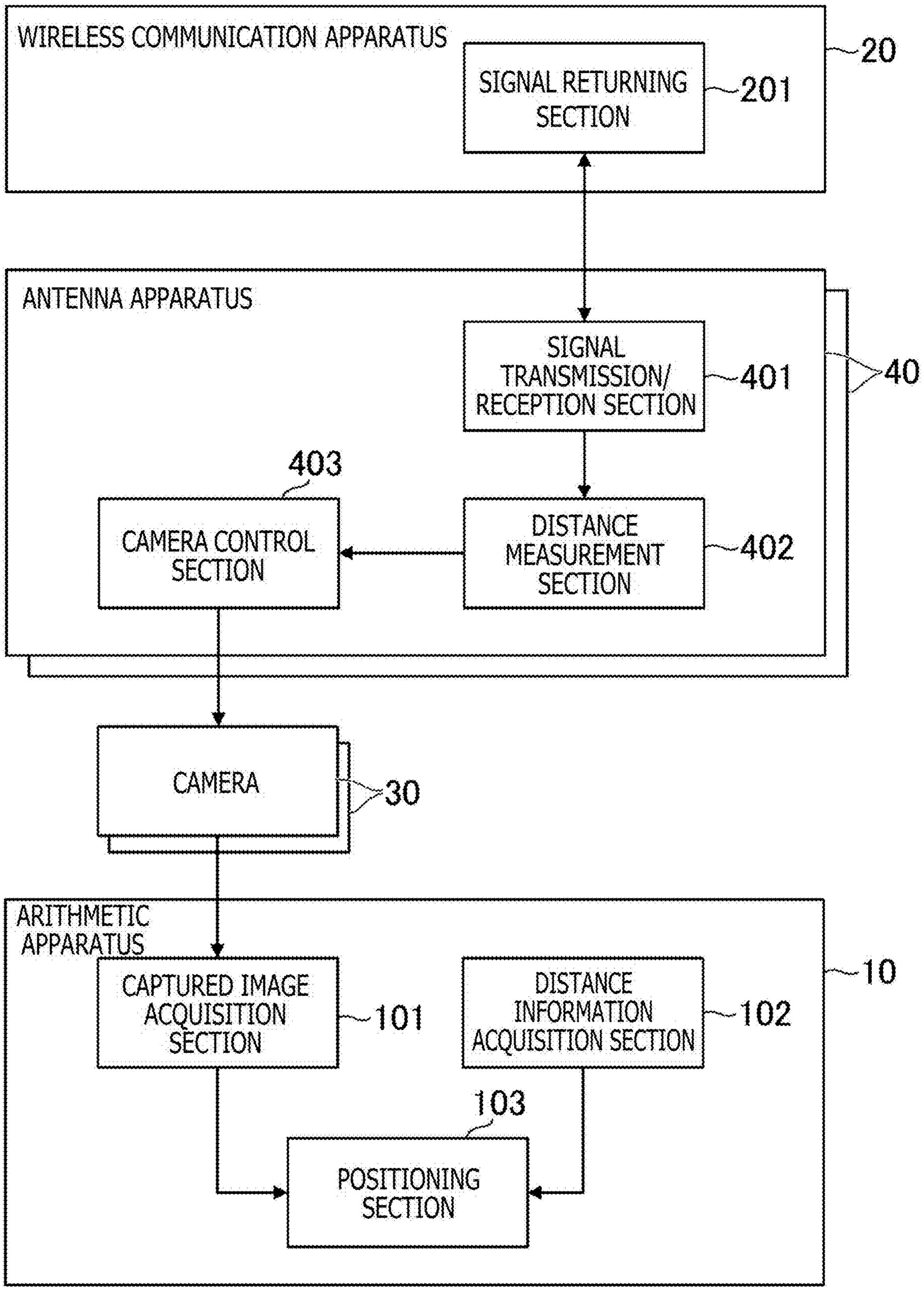
FIG. 3 is a functional block diagram illustrating an example of functions implemented in the positioning system.

FIG. 3 is a functional block diagram illustrating an example of functions implemented in the positioning system 1. FIG. 4 is a diagram illustrating an example of a method of calculating distance by a distance measurement section 402 to be described later. In the example described in the example illustrated in FIG. 3, the arithmetic apparatus 10 includes, as functions, a captured image acquisition section 101, a distance information acquisition section 102, and a positioning section 103. The captured image acquisition section 101, the distance information acquisition section 102, and the positioning section 103 may be implemented primarily by the control unit 11 of the arithmetic apparatus 10. Further, the wireless communication apparatus 20 includes, as a function, a signal returning section 201. The signal returning section 201 may be implemented primarily by the control unit 21 of the wireless communication apparatus 20.

Further, the antenna apparatus 40 includes, as functions, a signal transmission/reception section 401, the distance measurement section 402, and a camera control section 403. The signal transmission/reception section 401, the distance measurement section 402, and the camera control section 403 may be implemented primarily by the control unit 41 of the antenna apparatus 40. These functions may be implemented by the control unit of the apparatus including the antenna 43*a* illustrated in FIG. 4. For example, in a case where the antenna 43*a* is included in the camera 30 instead of the antenna apparatus 40, these functions may be implemented primarily by the control unit 31 of the camera 30.

The captured image acquisition section 101 of the arithmetic apparatus 10 acquires images captured by the plurality of cameras 30 (for example, the first camera 30A and the second camera 30B illustrated in FIG. 1). The captured image acquisition section 101 receives the captured images transmitted by the communication units 33 of the cameras 30 via the communication unit 13 of the arithmetic apparatus 10, thereby acquiring the plurality of captured images.

The positioning section 103 of the arithmetic apparatus 10 calculates the position of the user 2, who is a moving object (for example, the position of the head of the user 2), on the basis of the image captured by the camera 30 and acquired by the captured image acquisition section 101. For example, the positioning section 103 performs image analysis processing on the image captured by the camera 30 (for example, the first camera 30A or the second camera 30B illustrated in FIG. 1), thereby calculating the position of the user 2 relative to the camera 30. Then, the positioning section 103 calculates the position of the user 2 in the entire positioning system 1 on the basis of the position at which the camera 30 is disposed.

The distance information acquisition section 102 of the arithmetic apparatus 10 acquires information regarding distances calculated by the plurality of cameras 30 or the plurality of antenna apparatuses 40. The captured image acquisition section 101 receives the information regarding the distances transmitted by the communication units 43 of the antenna apparatuses 40 via the communication unit 13 of the arithmetic apparatus 10, thereby acquiring the information regarding a plurality of the distances. For example, the distance information acquisition section 102 acquires (receives) information regarding the distance (first distance) between the position of the first camera 30A, which is illustrated in FIG. 1, and the wireless communication apparatus 20 from the first camera 30A or the first antenna apparatus 40A, and acquires (receives) information regarding the distance (second distance) between the position of the second camera 30B and the wireless communication apparatus 20 from the second camera 30B or the second antenna apparatus 40B.

The positioning section 103 of the arithmetic apparatus 10 calculates the position of the user 2, who is a moving object (the position of the head of the user 2), on the basis of the image captured by the camera 30 and communication between the antenna 43*a* illustrated in FIG. 4 and the wireless communication apparatus 20 (more specifically, the antenna 23*a* illustrated in FIG. 4).

As described later, the distance measurement section 402 of the antenna apparatus 40 or the camera 30 calculates, on the basis of communication between the antenna 43*a* disposed at the position of the camera 30 and the wireless communication apparatus 20, the distance between the antenna 43*a* and the wireless communication apparatus 20. For example, the distance measurement section 402 of the first antenna apparatus 40A or the first camera 30A calculates, on the basis of communication between the antenna 43*a* disposed at the position of the first camera 30A and the wireless communication apparatus 20, the distance (first distance) between the antenna 43*a* and the wireless communication apparatus 20. Further, the distance measurement section 402 of the second antenna apparatus 40B or the second camera 30B calculates, on the basis of communication between the antenna 43*a* disposed at the position of the second camera 30B and the wireless communication apparatus 20, the distance (second distance) between the antenna 43*a* and the wireless communication apparatus 20.

The distance information acquisition section 102 of the arithmetic apparatus 10 acquires (receives) information regarding a plurality of the distances calculated by the respective distance measurement sections 402, from the respective antenna apparatuses 40 or the respective cameras 30, and the positioning section 103 of the arithmetic apparatus 10 calculates the position of the user 2 on the basis of images captured by the cameras 30 and the information regarding the plurality of distances acquired by the distance information acquisition section 102. In this way, the position of the moving object is calculated on the basis of communication via the antenna 43*a* in addition to captured images, thereby improving the positioning accuracy of the moving object compared to a case where the position of the moving object is calculated only from the captured images. For example, even in a case where occlusion occurs in the camera 30 or there is a delay in transmitting captured images from the camera 30, the position of the moving object can be calculated on the basis of communication via the antenna 43*a*.

Further, the positioning section 103 of the arithmetic apparatus 10 may correct, on the basis of the images captured by the cameras 30, the distances calculated by the respective distance measurement sections 402 or the position of the user 2 calculated on the basis of the plurality of distances calculated by the respective distance measurement sections 402. Also with this configuration, the positioning accuracy of the user 2, who is a moving object, can be improved.

As illustrated in FIG. 4, the distance measurement section 402 of the antenna apparatus 40 or the camera 30 calculates, on the basis of communication between the antenna 43*a* disposed at the position of the camera 30 and the wireless communication apparatus 20 (more specifically, the antenna 23*a*), the distance between the antenna apparatus 40 and the wireless communication apparatus 20. The signal transmission/reception section 401 of the antenna apparatus 40 or the camera 30 transmits a first signal (request) to the wireless communication apparatus 20 by using the antenna 43*a*. When the signal returning section 201 of the wireless communication apparatus 20 receives the first signal transmitted by the signal transmission/reception section 401 of the antenna apparatus 40 via the antenna 23*a*, the signal returning section 201 transmits (returns) a second signal (response) to the antenna 43*a*. The signal transmission/reception section 401 of the antenna apparatus 40 or the camera 30 receives the second signal transmitted (returned) by the antenna 23*a* by using the antenna 43*a*.

In the example illustrated in FIG. 4, T indicates the passage of time. Ta indicates a period from when the first signal (request) is transmitted via the antenna 43*a* to when the first signal is received by the antenna 23*a*. Tb indicates a period from when the first signal is received by the antenna 23*a* to when the second signal (response) is transmitted (returned). Tc indicates a period from when the second signal is transmitted (returned) to when the second signal is received by the antenna 43*a*. Td indicates a period from when the first signal is transmitted by the antenna 43*a* to when the second signal is received, that is, the series of periods from Ta to Tc.

The distance measurement section 402 calculates, on the basis of the periods taken for the signals to make a round trip between the antenna 43*a* disposed at the position of the camera 30 and the antenna 23*a* of the wireless communication apparatus 20, the distance between the antenna apparatus 40 (more specifically, the antenna 43*a*) and the wireless communication apparatus 20. In the example illustrated in FIG. 4, a distance D between the wearing device 30 and the antenna apparatus 40 can be calculated by a calculation formula such as D=speed of light*(Ta+Tc)/2 or D=speed of light*(Td−Tb)/2. Note that "*" indicates the multiplication sign.

The signal returning section 201 of the wireless communication apparatus 20 may transmit the second signal (response) with the period of Tb (a numerical value such as the number of seconds) added thereto, for example. In addition to this, for example, the signal returning section 201 may also add a time point at which the first signal has been received and a time point at which the second signal is transmitted, to the second signal, and transmit it. With this configuration, the distance measurement section 402 can identify the periods of Ta and Tc or the periods of Td and Tb on the basis of such information as the period or time points added to the second signal, the time point at which the first signal has been transmitted, and the time point at which the second signal has been received, thereby calculating the distance D between the antenna apparatus 40 and the wireless communication apparatus 20 or the wearing device 30. Note that, if the period of Tb is known, the signal returning section 201 may transmit the second signal without such information as the period or time points added thereto.

The camera control section 403 of the antenna apparatus 40 or the camera 30 causes the camera 30 to execute the image capturing processing in a case where the distance between the antenna 43*a* and the wireless communication apparatus 20 calculated by the distance measurement section 402 is within a predetermined range, but restricts the execution of the image capturing processing by the camera 30 in a case where the distance calculated by the distance measurement section 402 is outside the predetermined range. The camera 30 executes the image capturing processing in a case where the distance between the antenna 43*a* and the wireless communication apparatus 20 calculated by the distance measurement section 402 is within a predetermined range, but restricts the execution of the image capturing processing in a case where the distance calculated by the distance measurement section 402 is outside the predetermined range.

Here, "restricting the execution of the image capturing processing" may refer to stopping the image capturing processing executed by the camera 30 (for example, putting the camera 30 in the standby state), or reducing the resolution of an image to be captured by the camera 30. Further, "restricting the execution of the image capturing processing" may also refer to reducing the frequency of the image capturing processing to be executed by the camera 30. For example, in a case where the distance between the antenna 43*a* and the wireless communication apparatus 20 calculated by the distance measurement section 402 is within a predetermined range, the frequency of the image capturing processing to be executed by the camera 30 may be set to 60 fps (frames per second), but in a case where the distance calculated by the distance measurement section 402 is outside the predetermined range, the frequency of the image capturing processing to be executed by the camera 30 may be reduced from 60 fps to 15 fps. In this way, in a case where the user 2, who is a moving object, is not visible in the lens 38 of the camera 30, the execution of the image capturing processing by the camera 30 is restricted, thereby enabling a reduction in power consumption by the camera 30. Further, the camera 30 executes the image capturing processing in a case where the moving object is visible in the lens 38 of the camera 30, and positioning processing of the user 2 can thus be performed on the basis of the image captured by the camera 30.

The first camera 30A executes the image capturing processing in a case where a distance between the first antenna apparatus 40A (more specifically, the antenna 43*a* illustrated in FIG. 4) and the wireless communication apparatus 20 is smaller than a distance indicated by a long dashed short dashed line 410A (see FIG. 1) drawn between the first antenna apparatus 40A and a floor surface 8. The first camera 30A restricts, however, the execution of the image capturing processing in a case where the distance between the first antenna apparatus 40A and the wireless communication apparatus 20 is greater than the distance indicated by the long dashed short dashed line 410A. In the example illustrated in FIG. 1, the distance between the first antenna apparatus 40A and the wireless communication apparatus 20 is greater than the distance indicated by the long dashed short dashed line 410A. Therefore, the first camera 30A is restricting the execution of the image capturing processing. Here, the distance (second distance) indicated by the long dashed short dashed line 410A may be set to be greater than the focal length defined by the lens 38 of the first camera 30A (the first distance in which the image capturing from the position of the first camera 30A is possible). Between the first camera 30A and the floor surface 8, a space 300A with a conical shape in which the first camera 30A can capture an image can be defined by an angle of view θA of the first camera 30A. The distance indicated by the long dashed short dashed line 410A may be set to be greater than the length of a ridge line 310A that defines the boundary of the space 300A.

Similarly to this, the second camera 30B executes the image capturing processing in a case where a distance between the antenna 43*a* of the second antenna apparatus 40B and the wireless communication apparatus 20 is smaller than a distance indicated by a long dashed short dashed line 410B. The second camera 30B restricts, however, the execution of the image capturing processing in a case where the distance between the second antenna apparatus 40B and the wireless communication apparatus 20 is greater than the distance indicated by the long dashed short dashed line 410B. In the example illustrated in FIG. 1, the distance between the second antenna apparatus 40B and the wireless communication apparatus 20 is greater than the distance indicated by the long dashed short dashed line 410B. Therefore, the second camera 30B is restricting the execution of the image capturing processing. The distance of the long dashed short dashed line 410B may also be set on the basis of the focal length of the second camera 30B or the length of a ridge line 310B of a space 300B in which the first camera 30B can capture an image, similarly to the distance of the long dashed short dashed line 410A set for the first antenna apparatus 40A.

Figure 5A:
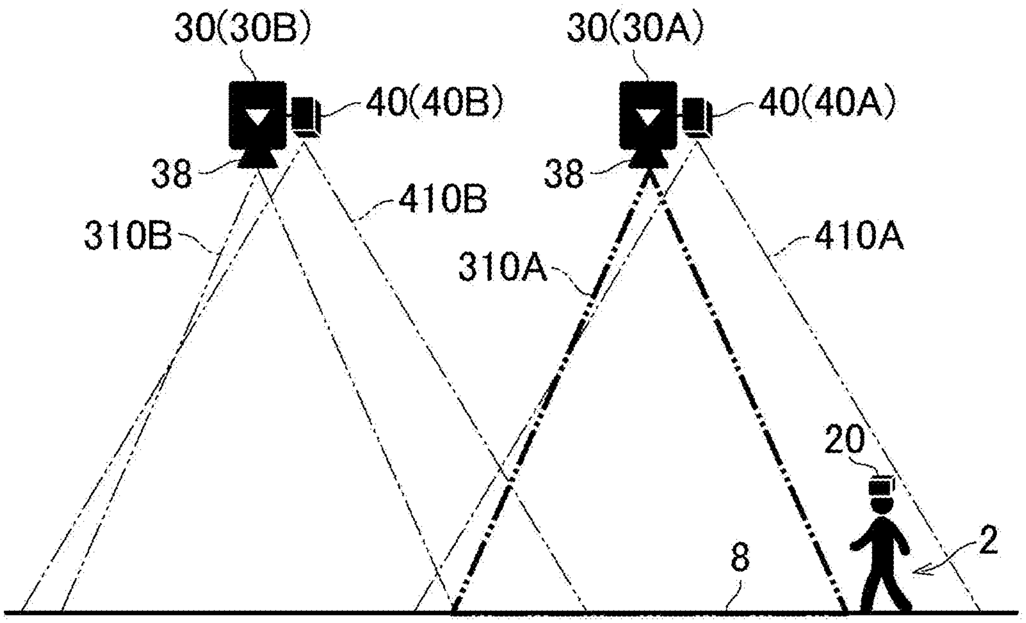
FIG. 5A is a diagram illustrating an example of the operation of the positioning system.
Figure 5B:
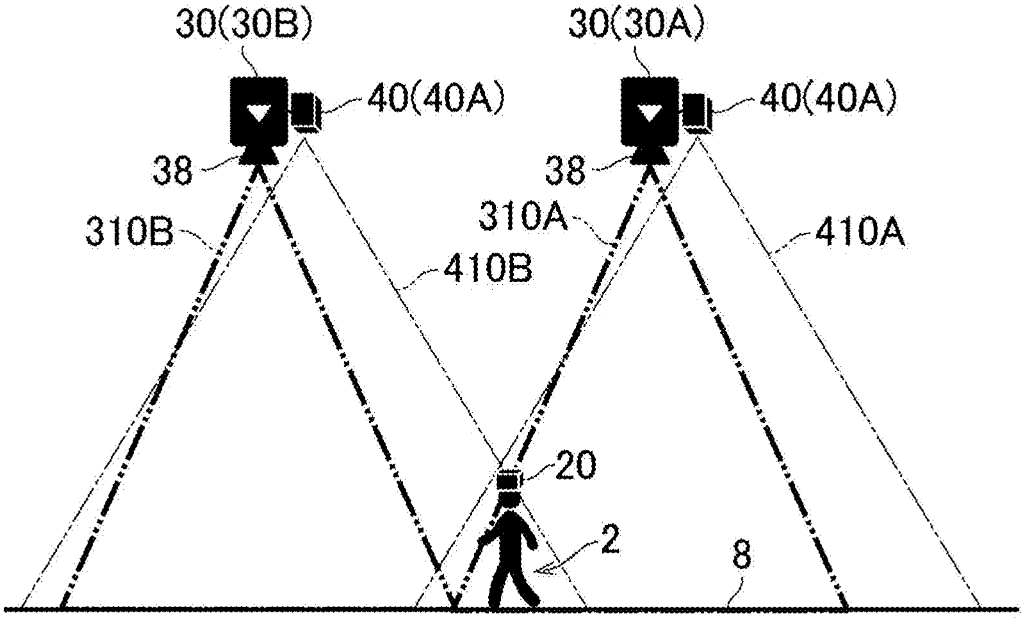
FIG. 5B is a diagram illustrating an example of the operation of the positioning system.
Figure 5C:
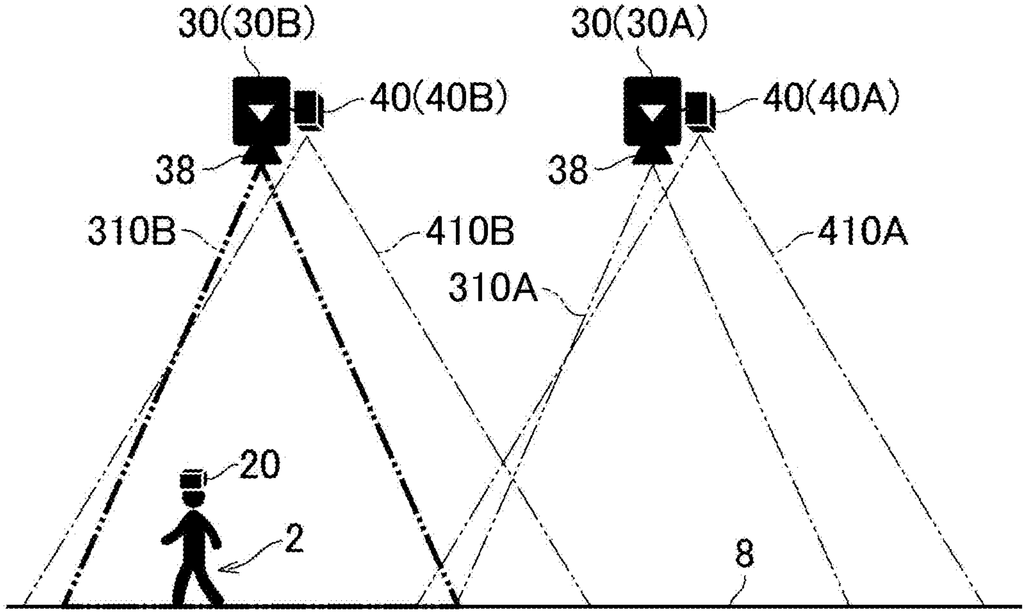
FIG. 5C is a diagram illustrating an example of the operation of the positioning system.

FIG. 5A to FIG. 5C are diagrams illustrating examples of the operation of the positioning system 1. In the example illustrated in FIG. 5A, the user 2 is closer to the first camera 30A than the position illustrated in FIG. 1. In the example illustrated in FIG. 5A, the distance between the antenna 43*a* of the first antenna apparatus 40A and the wireless communication apparatus 20 is smaller than the distance indicated by the long dashed short dashed line 410A. Therefore, in the example illustrated in FIG. 5A, the first camera 30A is executing the image capturing processing. Further, in the example illustrated in FIG. 5A, the user 2 is not visible in the lens 38 of the first camera 30A. In this way, the first camera 30A can start the image capturing processing before the user 2 begins to appear in the lens 38 of the first camera 30A. In the example illustrated in FIG. 5A, the execution of the image capturing processing by the second camera 30B is being restricted.

In the example illustrated in FIG. 5B, the user 2 has moved under the first camera 30A. In the example illustrated in FIG. 5B, the distance between the antenna 43*a* of the first antenna apparatus 40A and the wireless communication apparatus 20 is smaller than the distance indicated by the long dashed short dashed line 410A. Therefore, in the example illustrated in FIG. 5B, the first camera 30A is executing the image capturing processing. Further, in the example illustrated in FIG. 5B, the user 2, who is a moving object, is visible in the lens 38 of the first camera 30A. Therefore, the positioning section 103 of the arithmetic apparatus 10 can calculate the position of the user 2 on the basis of an image captured by the first camera 30A. Further, in the example illustrated in FIG. 5B, the distance between the antenna 43*a* of the second antenna apparatus 40B and the wireless communication apparatus 20 is smaller than the distance indicated by the long dashed short dashed line 410B. Therefore, in the example illustrated in FIG. 5B, the second camera 30B is executing the image capturing processing. The second camera 30B can also start the image capturing processing before the user 2 begins to appear in the lens 38 of the second camera 30B, similarly to the first camera 30A.

In the example illustrated in FIG. 5C, the user 2 has moved under the second camera 30B. In the example illustrated in FIG. 5C, the distance between the antenna 43*a* of the second antenna apparatus 40B and the wireless communication apparatus 20 is smaller than the distance indicated by the long dashed short dashed line 410B. Therefore, in the example illustrated in FIG. 5C, the second camera 30B is executing the image capturing processing. In the example illustrated in FIG. 5C, the user 2, who is a moving object, is visible in the lens 38 of the second camera 30B. Therefore, the positioning section 103 of the arithmetic apparatus 10 can calculate the position of the user 2 on the basis of an image captured by the second camera 30B. The distance between the antenna 43*a* of the first antenna apparatus 40A and the wireless communication apparatus 20 is greater than the distance indicated by the long dashed short dashed line 410A. Therefore, the first camera 30A is restricting the execution of the image capturing processing. In this way, in a case where the position of the wireless communication apparatus 20 (the position of the user 2) is significantly far from the position of the antenna 43*a*, the image capturing processing by the camera 30 is restricted, thereby enabling a reduction in power consumption by the camera 30.

4. Flowchart

Figure 6:
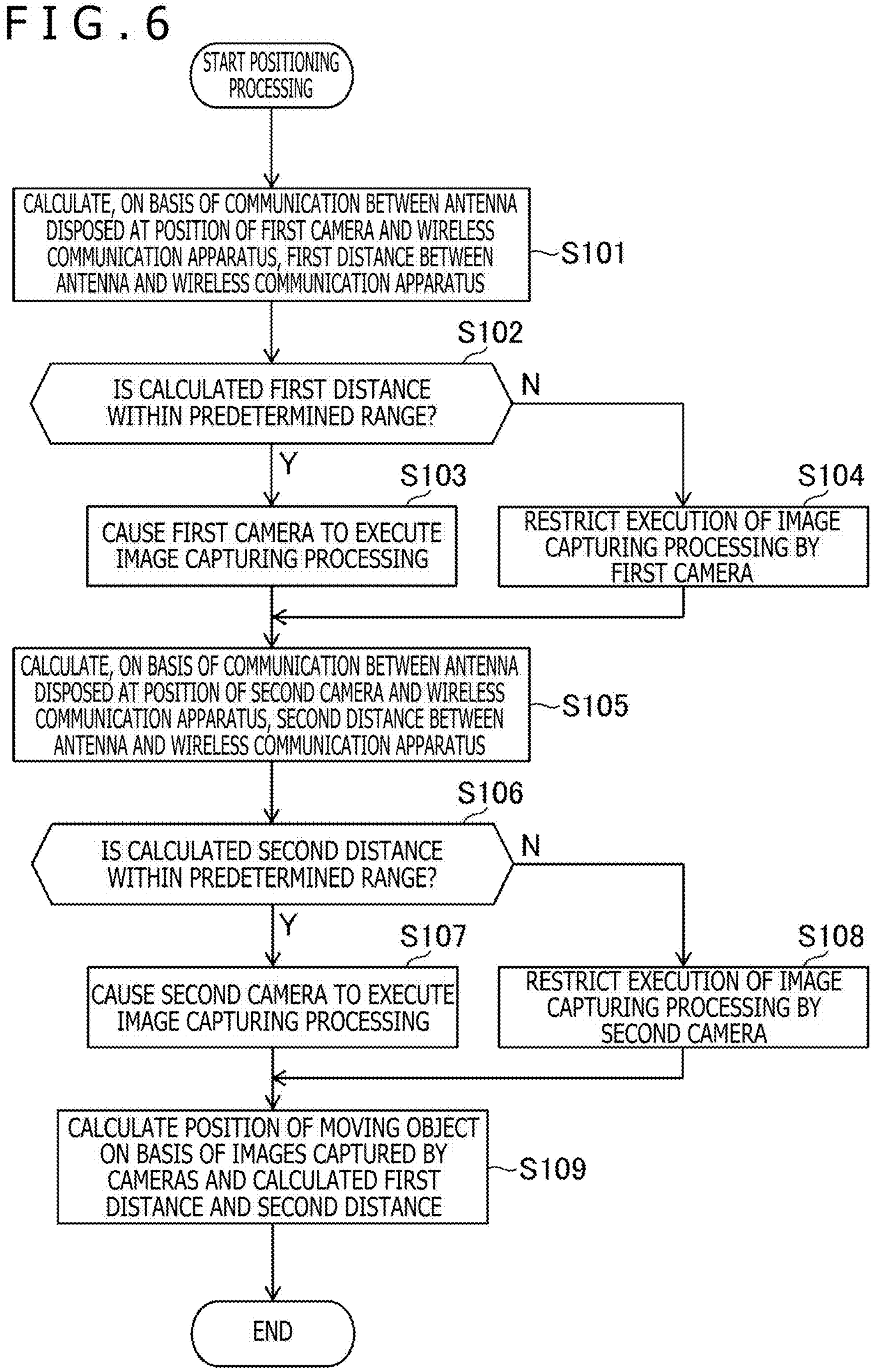
FIG. 6 is a diagram illustrating an example of positioning processing.

FIG. 6 is a diagram illustrating an example of the flow of distance measurement processing to be performed in the positioning system 1. The distance measurement processing illustrated in FIG. 6 may repeatedly be executed in a period in which the arithmetic apparatus 10 and the wireless communication apparatus 20 are executing an application such as a game, for example.

First, as illustrated in FIG. 6, the distance measurement section 402 of the first antenna apparatus 40A or the first camera 30A calculates, on the basis of communication between the antenna 43*a* (first antenna) disposed at the position of the first camera 30A and the wireless communication apparatus 20, the first distance between the antenna 43*a* and the wireless communication apparatus 20 (Step S101). In Step S101, the signal transmission/reception section 401 of the first camera 30A or the first antenna apparatus 40A transmits the first signal (request) to the wireless communication apparatus 20, and the signal returning section 201 of the wireless communication apparatus 20 returns the second signal (response) to the first antenna apparatus 40A or the first camera 30A. Then, the distance measurement section 402 of the first antenna apparatus 40A or the first camera 30A calculates the distance between the antenna 43*a* and the wireless communication apparatus 20 on the basis of the response period of the first signal and the second signal. In Step S101, for example, the distance measurement section 402 substitutes the period Ta and the period Tc (or the period Td and the period Tb) taken for the first signal and the second signal to make a round trip into a predetermined calculation formula, as illustrated in FIG. 4, thereby calculating the distance between the antenna 43*a* and the wireless communication apparatus 20.

Next, the camera control section 403 of the first antenna apparatus 40A or the first camera 30A determines whether or not the first distance calculated in Step S101 is within a predetermined range (Step S102). In Step S102, the camera control section 403 determines, for example, whether or not the first distance is equal to or smaller than the distance of the long dashed short dashed line 410A, which is illustrated in FIG. 1 and the like. In a case where the camera control section 403 determines that the first distance is within the predetermined range (Y in Step S102), the camera control section 403 causes the first camera 30A to execute the image capturing processing (Step S103). Further, in a case where the camera control section 403 determines that the first distance is not within the predetermined range (determines that the first distance is outside the predetermined range) (N in Step S102), the camera control section 403 restricts the execution of the image capturing processing by the first camera 30A (Step S104).

Similarly to the distance measurement section 402 of the first antenna apparatus 40A or the first camera 30A, the distance measurement section 402 of the second antenna apparatus 40B or the second camera 30B calculates, on the basis of communication between the antenna 43*a* (second antenna) disposed at the position of the second camera 30B and the wireless communication apparatus 20, the second distance between the antenna 43*a* and the wireless communication apparatus 20 (Step S105). Next, the camera control section 403 of the second antenna apparatus 40B or the second camera 30B determines whether or not the second distance calculated in Step S105 is within a predetermined range (Step S106). In Step S106, the camera control section 403 determines, for example, whether or not the second distance is equal to or smaller than the distance of the long dashed short dashed line 410B, which is illustrated in FIG. 1 and the like. In a case where the camera control section 403 determines that the second distance is within the predetermined range (Y in Step S106), the camera control section 403 causes the second camera 30B to execute the image capturing processing (Step S107). Further, in a case where the camera control section 403 determines that the second distance is not within the predetermined range (determines that the second distance is outside the predetermined range) (N in Step S106), the camera control section 403 restricts the execution of the image capturing processing by the second camera 30B (Step S108).

Note that, in the positioning processing illustrated in FIG. 6, the processing of Step S105 to Step S108 may be executed before the processing of Step S101 to Step S104, or may be executed simultaneously with the processing of Step S101 to Step S104. Further, in a case where the positioning system 1 includes, for example, a camera 30 different from the first camera 30A and the second camera 30B and an antenna apparatus 40 different from the first antenna apparatus 40A and the second antenna apparatus 40B, the camera 30 and the antenna apparatus 40 may also execute processing similar to the processing of Step S101 to Step S104.

Next, the positioning section 103 of the arithmetic apparatus 10 calculates the position of the user 2, who is a moving object, on the basis of the images captured by the first camera 30A and the second camera 30B, the first distance calculated in Step S101, and the second distance calculated in Step S105 (Step S109). In this way, the position of the moving object is calculated on the basis of, in addition to the images captured by the camera 30, the distance between the antenna 43*a* and the wireless communication apparatus 20 calculated on the basis of communication via the antenna 43*a*, thereby improving the positioning accuracy of the moving object compared to a case where the position of the moving object is calculated only from the captured images.

5. Conclusion (1) As described above, the positioning system 1 described in the present disclosure includes the camera 30 for capturing an image of a moving object, the antenna 43*a* disposed at the position of the camera 30, the arithmetic apparatus 10 configured to calculate the position of the moving object on the basis of an image captured by the camera 30, and the wireless communication apparatus 20 to be held by the moving object, the wireless communication apparatus 20 being capable of communicating with the antenna 43*a*. The antenna apparatus 40 or the camera 30, which is an apparatus including the antenna 43*a*, calculates the distance between the antenna 43*a* and the wireless communication apparatus 20 on the basis of communication between the antenna 43*a* and the wireless communication apparatus 20. The camera 30 executes image capturing processing in a case where the calculated distance is within a predetermined range, but restricts the execution of the image capturing processing in a case where the calculated distance is outside the predetermined range. With this configuration, power consumption by the camera 30 in the positioning system 1 can be reduced.

(5) Further, the positioning method described in the present disclosure is performed in the positioning system 1 including the camera 30 for capturing an image of a moving object, the antenna 43*a* disposed at the position of the camera 30, the arithmetic apparatus 10 configured to calculate the position of the moving object on the basis of an image captured by the camera 30, and the wireless communication apparatus 20 to be held by the moving object, the wireless communication apparatus 20 being capable of communicating with the antenna 43*a*. The method includes calculating, by an apparatus including the antenna 43*a*, the distance between the antenna 43*a* and the wireless communication apparatus 20 on the basis of communication between the antenna 43*a* and the wireless communication apparatus 20. The method also includes executing, by the camera 30, image capturing processing in a case where the calculated distance is within a predetermined range, but restricting the execution of the image capturing processing in a case where the calculated distance is outside the predetermined range. With this configuration, power consumption by the camera 30 in the positioning system 1 can be reduced.

(2) In the positioning system 1 according to (1) above, the camera 30 may be capable of capturing an image up to the first distance from the position of the camera 30. The camera 30 may execute the image capturing processing in a case where the calculated distance is equal to or smaller than the second distance that is greater than the first distance, but restrict the execution of the image capturing processing in a case where the calculated distance is greater than the second distance. With this configuration, the image capturing processing by the first camera 30 can start before the moving object appears in the lens 38 of the first camera 30.

(3) In the positioning system 1 according to (1) or (2) above, the arithmetic apparatus 10 may calculate the position of the moving object on the basis of the image captured by the camera 30 and the communication between the antenna 43*a* and the wireless communication apparatus 20. With this configuration, the positioning accuracy of the moving object can be improved compared to a case where the position of the moving object is calculated only from the image captured by the camera 30.

(4) The positioning system 1 described in the present disclosure includes the first camera 30A for capturing an image of a moving object, the second camera 30B disposed apart from the first camera 30A, for capturing an image of the moving object, the first antenna 43*a* disposed at the position of the first camera 30A, the second antenna 43*a* disposed at the position of the second camera 30B, the arithmetic apparatus 10 configured to calculate the position of the moving object on the basis of an image captured by the camera 30 including at least the first camera 30A or the second camera 30B, and the wireless communication apparatus 20 to be held by the moving object, the wireless communication apparatus 20 being capable of communicating with the first antenna 43*a* and the second antenna 43*a*. The first antenna apparatus 40A or the first camera 30A, which is an apparatus including the first antenna 43*a*, calculates the first distance between the first antenna 43*a* and the wireless communication apparatus 20 on the basis of communication between the first antenna 43*a* and the wireless communication apparatus 20. The second antenna apparatus 40B or the second camera 30B, which is an apparatus including the second antenna 43*a*, calculates the second distance between the second antenna 43*a* and the wireless communication apparatus 20 on the basis of communication between the second antenna 43*a* and the wireless communication apparatus 20. The first camera 30A executes image capturing processing in a case where the calculated first distance is within a predetermined range, but restricts the execution of the image capturing processing in a case where the calculated first distance is outside the predetermined range. The second camera 30B executes image capturing processing in a case where the calculated second distance is within a predetermined range, but restricts the execution of the image capturing processing in a case where the calculated second distance is outside the predetermined range. With this configuration, power consumption by the camera 30 in the positioning system 1 can be reduced.

(6) Further, the positioning method described in the present disclosure is performed in the positioning system 1 including the first camera 30A for capturing an image of a moving object, the second camera 30B disposed apart from the first camera 30A, for capturing an image of the moving object, the first antenna 43*a* disposed at the position of the first camera 30A, the second antenna 43*a* disposed at the position of the second camera 30B, the arithmetic apparatus 10 configured to calculate the position of the moving object on the basis of an image captured by the camera 30 including at least the first camera 30A or the second camera 30B, and the wireless communication apparatus 20 to be held by the moving object, the wireless communication apparatus 20 being capable of communicating with the first antenna 43*a* and the second antenna 43*a*. The method includes calculating, by the first antenna apparatus 40A or the first camera 30A, which is an apparatus including the first antenna 43*a*, the first distance between the first antenna 43*a* and the wireless communication apparatus 20 on the basis of communication between the first antenna 43*a* and the wireless communication apparatus 20, calculating, by the second antenna apparatus 40B or the second camera 30B, which is an apparatus including the second antenna 43*a*, the second distance between the second antenna 43*a* and the wireless communication apparatus 20 on the basis of communication between the second antenna 43*a* and the wireless communication apparatus 20, executing, by the first camera 30A, image capturing processing in a case where the calculated first distance is within a predetermined range, but restricting the execution of the image capturing processing in a case where the calculated first distance is outside the predetermined range, and executing, by the second camera 30B, image capturing processing in a case where the calculated second distance is within a predetermined range, but restricting the execution of the image capturing processing in a case where the calculated second distance is outside the predetermined range. With this configuration, power consumption by the camera 30 in the positioning system 1 can be reduced.

The present disclosure is not limited to the above-mentioned embodiment. For example, examples obtained through modification of the above-mentioned embodiment may also be included within the technical scope of the present disclosure.

In the embodiment, there has been described an example in which the antenna apparatus 40 or the camera 30, which includes the antenna 43*a*, calculates the distance between the antenna 43*a* and the wireless communication apparatus 20 on the basis of communication between the antenna 43*a* and the wireless communication apparatus 20. The present disclosure is not limited to this, and, for example, the wireless communication apparatus 20 may have the functions of the signal transmission/reception section 401 and the distance measurement section 402 described above, and the antenna apparatus 40 or the camera 30 may have the function of the above-mentioned signal returning section 201. For example, the control unit 21 (distance measurement section 402) of the wireless communication apparatus 20 may calculate the distance between the antenna 43*a* and the wireless communication apparatus 20 (for example, the first distance between the antenna 43*a* included in the first antenna apparatus 40A or the first camera 30A and the wireless communication apparatus 20, or the second distance between the antenna 43*a* included in the second antenna apparatus 40B or the second camera 30B and the wireless communication apparatus 20) on the basis of communication between the antenna 43*a* and the wireless communication apparatus 20. In this case, the wireless communication apparatus 20 may transmit information regarding the calculated distance between the antenna 43*a* and the wireless communication apparatus 20 to the antenna apparatus 40 or the camera 30. With this, the camera control section 403 of the antenna apparatus 40 or the camera 30 can cause the camera 30 to execute the image capturing processing or to restrict the execution of the image capturing processing, on the basis of whether or not the distance received from the wireless communication apparatus 20 is within a predetermined range. Even with this configuration, power consumption by the camera 30 in the positioning system 1 can be reduced.

Further, the arithmetic apparatus 10 may have the function of the above-mentioned distance measurement section 402. For example, the control unit 11 (distance measurement section 402) of the arithmetic apparatus 10 may calculate the distance between the antenna 43*a* and the wireless communication apparatus 20 on the basis of communication between the antenna 43*a* and the wireless communication apparatus 20. For example, the arithmetic apparatus 10 may receive information regarding the period Ta and the period Tc (or the period Td and the period Tb) taken for the first signal and the second signal to make a round trip, which are illustrated in FIG. 4, from the wireless communication apparatus 20, the camera 30, or the antenna apparatus 40, thereby calculating the distance between the antenna 43*a* and the wireless communication apparatus 20. In this case, the arithmetic apparatus 10 may transmit information regarding the distance calculated in the distance measurement section 402 to the antenna apparatus 40 or the camera 30. The camera control section 403 of the antenna apparatus 40 or the camera 30 can cause the camera 30 to execute the image capturing processing or to restrict the execution of the image capturing processing, on the basis of whether or not the distance received from the arithmetic apparatus 10 is within a predetermined range. Even with this configuration, power consumption by the camera 30 in the positioning system 1 can be reduced.

Further, in the embodiment, there has been described an example in which, when the signal transmission/reception section 401 of the antenna apparatus 40 or the camera 30 transmits the first signal (request) to the wireless communication apparatus 20 by using the antenna 43*a*, the signal returning section 201 of the wireless communication apparatus 20 returns the second signal (response), and the distance measurement section 402 calculates the position of the user 2 on the basis of communication between the antenna 43*a* and the wireless communication apparatus 20. Here, the signal returning section 201 may add identification information for identifying the individual wireless communication apparatuses 20 to the second signal and transmit it. With this configuration, in a case where the plurality of wireless communication apparatuses 20 are present in the positioning system 1 (in a case where the plurality of users 2 wearing or possessing the wireless communication apparatuses 20 are present), it becomes possible to calculate the position of each of the users 2 and identify the wireless communication apparatus 20 worn by each of the users 2. Further, the signal returning section 201 may add identification information for identifying each of the users 2 (for example, the ID (Identification) or name of the user 2 or the like) to the second signal and transmit it. Further, any of the storage units 12, 22, 32, and 42 of the respective apparatuses may store identification information for identifying each of the wireless communication apparatuses 20 and identification information for identifying each of the users 2, in association with each other. With this configuration, it becomes possible to calculate the position of each of the users 2 and identify the individual users 2.

The invention claimed is:

1. A positioning system comprising:

a camera for capturing an image of a moving object;

an antenna disposed at a position of the camera;

an arithmetic-apparatus configured to calculate a position of the moving object at least on a basis of an image captured by the camera; and a wireless communication apparatus to be held by the moving object, the wireless communication apparatus for enabling communication with the antenna, wherein an apparatus including the antenna, the wireless communication apparatus, or the arithmetic apparatus calculates a distance between the antenna and the wireless communication apparatus on a basis of the communication between the antenna and the wireless communication apparatus, the camera executes image capturing processing in a case where the calculated distance is within a predetermined range, but restricts execution of the image capturing processing in a case where the calculated distance is outside the predetermined range, the camera is capable of capturing an image up to a first distance from the position of the camera, and the camera executes the image capturing processing in a case where the calculated distance is equal to or smaller than a second distance that is greater than the first distance, but restricts the execution of the image capturing processing in a case where the calculated distance is greater than the second distance.

2. The positioning system according to claim 1, wherein the arithmetic apparatus calculates the position of the moving object on a basis of the image captured by the camera and the communication between the antenna and the wireless communication apparatus.

3. A positioning system comprising:

a first camera for capturing an image of a moving object;

a second camera disposed apart from the first camera, for capturing an image of the moving object;

a first antenna disposed at a position of the first camera and comprising a distance measurement section;

a second antenna disposed at a position of the second camera;

an arithmetic apparatus configured to calculate a position of the moving object at least on a basis of an image captured by one or both of the first camera and the second camera; and a wireless communication apparatus to be held by the moving object, the wireless communication apparatus for enabling communication with the first antenna and the second antenna, wherein;

the wireless communication apparatus comprising a control unit for calculating a first distance between the wireless communication apparatus and the first camera based on the communication between the wireless communication apparatus and the first antenna, the control unit is further configured for calculating a second distance between the wireless communication apparatus and the second camera based on communication between the wireless communication apparatus and the second antenna, the first antenna is capable of communicating with the wireless communication apparatus within at least a first communication range, the second antenna is capable of communicating with the wireless communication apparatus within at least a second communication range, the first camera executes image capturing processing in a case where the first distance is within the first communication range of the first antenna, but restricts execution of the image capturing processing when the first distance is outside the first communication range, and the second camera executes image capturing processing in a case where the second distance is within the second communication range of the second antenna, but restricts execution of the image capturing processing when the second distance is outside the second communication range.

4. A positioning method performed in a positioning system including:

a camera for capturing an image of a moving object, an antenna disposed at a position of the camera, an arithmetic apparatus configured to calculate a position of the moving object at least on a basis of an image captured by the camera, and a wireless communication apparatus to be held by the moving object, the wireless communication apparatus for enabling communication with the antenna, the method comprising:

calculating, by a control unit of the wireless communication apparatus, a distance between the antenna and the wireless communication apparatus on a basis of the communication between the antenna and the wireless communication apparatus; and determining whether the distance as calculated is within a predetermined range:

in accordance with a determination that the distance as calculated is within the predetermined range, capturing, by the camera, the image of the moving object, and in accordance with a determination that the distance as calculated is outside of the predetermined range, restricting execution of an image capturing processing at the camera.

5. The positioning method of claim 4, wherein:

the antenna is capable of communicating with the wireless communication apparatus within a communication range, the camera is capable of capturing an image within an imaging range, and the imaging range of the camera is smaller than the communication range of the antenna.

6. The positioning method of claim 5, further comprising:

capturing the image of the moving object, and calculating the position of the moving object on the basis of the image of the moving object as captured and the communication between the antenna and the wireless communication apparatus.

7. The positioning system of claim 3, wherein the image capturing processing at the second camera is restricted while the first camera is executing the image capturing process.

8. The positioning system of claim 3, wherein:

the first camera is capable of capturing an image within a first imaging range, the second camera is capable of capturing an image within a second imaging range, and each of the first imaging range and the second imaging range is smaller than each of the first communication range and the second communication range.

9. The positioning system of claim 8, wherein:

the first camera and the second camera are positioned with respect to each other such that the first imaging range and the second imaging range do not overlap.

10. The positioning system of claim 3, wherein:

the first camera and the second camera are positioned with respect to each other such that the first communication range and the second communication range overlap.

* * * * *